United States Patent
Uhrich et al.

(10) Patent No.: US 8,583,351 B2
(45) Date of Patent: *Nov. 12, 2013

(54) APPROACH FOR CONTROLLING A VEHICLE ENGINE THAT INCLUDES AN ELECTRIC BOOSTING DEVICE

(75) Inventors: Michael James Uhrich, West Bloomfield, MI (US); James Michael Kerns, Trenton, MI (US); Gopichandra Surnilla, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/614,785

(22) Filed: Sep. 13, 2012

(65) Prior Publication Data

US 2013/0006507 A1 Jan. 3, 2013

Related U.S. Application Data

(63) Continuation of application No. 12/474,077, filed on May 28, 2009, now Pat. No. 8,271,183.

(51) Int. Cl.
*G06F 19/00* (2011.01)
*F02B 33/44* (2006.01)
*F02D 41/06* (2006.01)
*F02M 25/08* (2006.01)

(52) U.S. Cl.
USPC ............... 701/113; 123/179.16; 123/179.18; 123/520; 123/564; 701/103

(58) Field of Classification Search
USPC ............ 123/179.3, 179.16, 179.18, 518–520, 123/564, 565, 575, 576; 701/101–103, 113; 60/597, 607, 608
See application file for complete search history.

(56) References Cited

U.S. PATENT DOCUMENTS

| | | | |
|---|---|---|---|
| 5,979,418 A | 11/1999 | Saruwatari et al. |
| 6,138,644 A | 10/2000 | Saruwatari et al. |
| 6,463,889 B2 | 10/2002 | Reddy |
| 6,494,192 B1 | 12/2002 | Capshaw et al. |
| 6,688,104 B2 | 2/2004 | Baeuerle et al. |
| 6,910,467 B2 | 6/2005 | Murakami et al. |
| 6,938,419 B2 | 9/2005 | Okuyama et al. |

(Continued)

FOREIGN PATENT DOCUMENTS

| | | |
|---|---|---|
| JP | 2003328801 A | 11/2003 |
| JP | 2005188484 A | 7/2005 |

*Primary Examiner* — Willis R Wolfe, Jr.
(74) *Attorney, Agent, or Firm* — Julia Voutyras; Alleman Hall McCoy Russell & Tuttle LLP

(57) ABSTRACT

A method of operating a vehicle including an engine is provided. The engine may include at least one cylinder, a boosting device to boost intake air to the at least one cylinder, a fuel tank, a fuel vapor canister to store fuel vapors vented from the fuel tank, and an emission control device to treat exhaust gas from the engine. The boosting device includes a compressor at least partially driven by an electric motor. The method includes during an engine cold start condition, operating the electric motor of the boost device to boost intake air, directing the boosted intake air through the fuel vapor canister to release a fuel vapor stored in the fuel vapor canister, directing the fuel vapor from the fuel vapor canister to the engine, and performing combustion in the at least one cylinder using the fuel vapor during the engine starting.

19 Claims, 4 Drawing Sheets

(56) References Cited

U.S. PATENT DOCUMENTS

| | | |
|---|---|---|
| 7,137,253 B2 | 11/2006 | Furman et al. |
| 7,284,541 B1 | 10/2007 | Uchida |
| 8,271,183 B2 * | 9/2012 | Uhrich et al. ............ 701/113 |
| 2005/0000217 A1 | 1/2005 | Nau et al. |
| 2010/0263639 A1 | 10/2010 | Uhrich et al. |

* cited by examiner

APPROACH FOR CONTROLLING A VEHICLE ENGINE THAT INCLUDES AN ELECTRIC BOOSTING DEVICE

BACKGROUND/SUMMARY

Engine out cold-start emissions generated before light-off of an exhaust system catalytic converter may contribute a large percentage of the total exhaust emissions. To expedite the attainment of the catalyst light-off temperature, engine systems have been developed that may increase an amount of fuel injected during startup to substantially increase the exhaust temperature to thereby decrease the light-off time of the catalytic converter.

However, the inventors herein have recognized issues with such an approach. As one example, the increase in the amount of fuel injected during startup may lower the engine operating efficiency and reduce fuel economy performance of the vehicle.

Thus, in one example, the above issue may be addressed by a system or a method of operating a vehicle including an engine. The engine may include at least one cylinder, a boosting device to boost intake air to the at least one cylinder, a fuel tank, a fuel vapor canister to store fuel vapors vented from the fuel tank, and an emission control device to treat exhaust gas from the engine. The boosting device includes a compressor at least partially driven by an electric motor. The method includes during an engine cold start condition, operating the electric motor of the boost device to boost intake air, directing the boosted intake air through the fuel vapor canister to release a fuel vapor stored in the fuel vapor canister, directing the fuel vapor from the fuel vapor canister to the engine, and performing combustion in the at least one cylinder using the fuel vapor during the engine starting.

By providing fuel vapor for combustion, cylinder wall wetting as a result of liquid fueling that would inhibit cylinder wall heating may be reduced. In this way, during a cold start condition, cylinder heating and correspondingly emission control device heating may be improved. Moreover, by using a boosting device to provide fuel vapor from the fuel vapor canister, fuel vapor may be used for combustion during combustion to improve air-fuel mixing and thus reduce starting emissions before a catalyst has reached its light-off temperature. In this way, fuel efficiency may be improved and vehicle emissions may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for reducing the amount of time needed for an engine operating temperature and/or an emission control device light-off temperature to be attained in an exhaust after-treatment system coupled to a vehicle engine. More particularly, the following description relates to, during a cold start condition, using a boosting device to direct fuel vapor stored in a fuel vapor canister to the engine for combustion.

Figure 1:
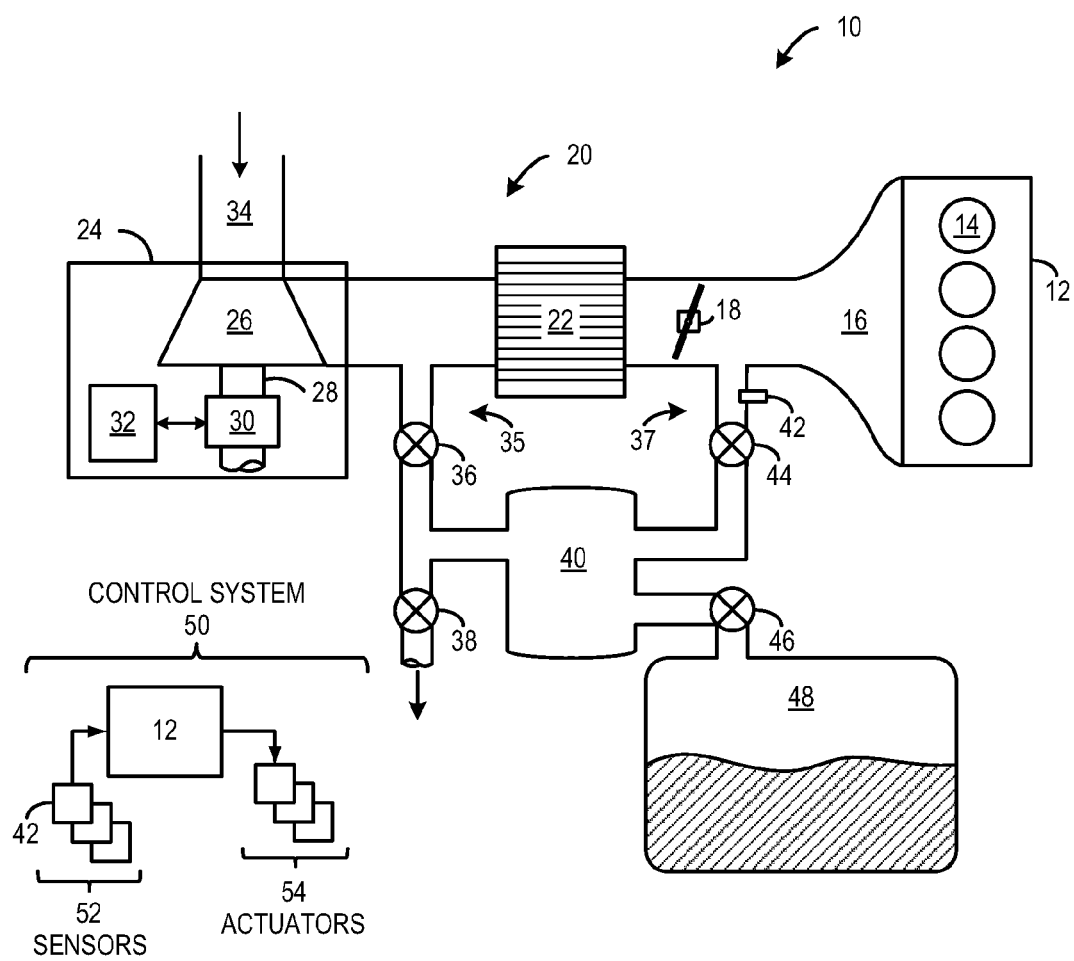
FIG. 1 shows a schematic depiction of a vehicle system including an engine and an associated fuel system.

FIG. 1 is a schematic depiction of an embodiment of an engine system 10 of a vehicle. The engine system 10 includes an engine 12. The engine 12 includes a plurality of cylinders 14 in which internal combustion may be carried out. Engine system 10 includes an engine intake manifold 16. A throttle 18 may be fluidly coupled to the intake manifold 16 via intake passage 20. Throttle 18 may be located in intake passage 20 downstream of an intercooler 22 and a boosting device 24. In the illustrated embodiment, boosting device 24 may take a form of an electronic turbocharger. Note the boosting device may be any suitable device capable of compressing intake air to be supplied to the cylinders of the engine.

The boosting device 24 may include a compressor 26, arranged in intake passage 20 between an air inlet 34 and intake manifold 16. Compressor 26 may be at least partially powered by an exhaust turbine 56 (shown in FIG. 2), arranged in an exhaust passage of engine system 10. The compressor 26 may be coupled to the exhaust turbine 56 via shaft 28. The compressor 26 also may be at least partially powered by an electric motor/generator 30. In the depicted example, electric motor/generator 30 is shown coupled to shaft 28. However, other suitable coupling configurations of the electric motor may be possible. Electric motor/generator 30 may be powered by an electric storage device 32 in electrical communication with motor/generator 30. The electric storage device 32 may be configured to store an electric charge received from any suitable electrical power source. For example, the electric storage device may store electrical power received from an alternator coupled to the engine. As another example, the electrical storage device may be configured to store electrical power received via regenerative braking operations in which motor/generator 30 generates electricity during vehicle braking. As yet another example, the electrical storage device may be configured to store electrical power received from an electrical power source external to the vehicle, such as a electrical outlet. By using electric motor/generator 30 to operate boosting device 24, for example during engine starting, an electric boost (e-boost) may be provided to the intake air charge when boost would otherwise not be generated by a turbocharger driven only by exhaust gas. The increased compression generated by the boost may further be increased via intercooler 22. The increased air charge may result in an increase in combustion efficiency and may cause engine/exhaust temperature to increase more quickly at cold start. Further, once the engine is running and a sufficient amount of exhaust has been generated to drive exhaust turbine 56, and consequently compressor 26, operation of the electric motor may be adjusted (for example, decreased). In some cases, boosting device 24 may transition to only providing boost generated via exhaust gas. In some cases, boosting device 24 may provide boost generated via exhaust gas and motor/generator 30.

Furthermore, as described herein, under some conditions boosting device 24 may be operated by motor/generator 30 at cold start to force fuel vapor stored in a fuel vapor canister 40 to cylinders 14 for internal combustion. By using fuel vapor for internal combustion the temperature of walls of cylinders 14 may increase quicker than if internal combustion were to be carried out only using liquid fuel, such as provided via fuel injection. The quicker increase in cylinder temperature may result in a quicker increase in emission control device temperature to a light-off temperature which may lead to more efficient exhaust after-treatment. Moreover, by using fuel vapor for combustion, release of fuel vapor to the atmosphere may be reduced or avoided and fuel economy performance may be improved.

Continuing with FIG. 1, an upstream passage 35 may be positioned between boosting device 24 and intercooler 22. In some embodiments, upstream passage 35 may be positioned downstream of intercooler 22 and upstream of a fuel vapor canister 40. An upstream valve 36 may be positioned in upstream passage 35 to control air flow in upstream passage 35. The upstream valve 36 may be controlled to selectively allow boosted air to flow to fuel vapor canister 40. An atmosphere valve 38 may positioned downstream of upstream valve 36 and upstream from fuel vapor canister 40. The atmosphere valve 38 may be controlled to selectively vent fuel vapor and in some cases air to the atmosphere. Fuel vapor canister may store fuel vapor selectively vented from a fuel tank 48. A fuel tank vent valve 46 may be positioned between fuel tank 48 and fuel vapor canister 40. The fuel tank vent valve 46 may be controlled to selectively vent fuel vapor from fuel tank 48 into fuel vapor canister 40. A downstream passage 37 may be positioned between fuel vapor canister 40 and intake manifold 16. A downstream valve 44 may be positioned in downstream passage 37 between fuel vapor canister 40 and intake manifold 16. The downstream valve 44 may be controlled to selectively allow fuel vapor from fuel vapor canister 40 to flow into intake manifold 16. A fuel vapor sensor 42 may be positioned in downstream passage 37. In some embodiments, fuel vapor sensor 42 may be positioned between downstream valve 44 and intake manifold 16. In some embodiments, fuel vapor sensor 42 may be positioned between fuel vapor canister 40 and downstream valve 44. The fuel vapor sensor 42 may be configured to measure hydrocarbons in downstream passage 37.

Under some conditions, such as during engine cold start, throttle 18 may be at least partially closed and boosting device 24 may be controlled via electric motor/generator 30 to force boosted air into upstream passage 35. Upstream valve 36 may be at least partially opened and atmosphere valve 38 may be closed to force the boosted air into fuel vapor canister 40. Meanwhile, fuel tank vent valve 46 may be closed and downstream valve 44 may be at least partially opened so that the boosted air forces fuel vapor stored in fuel vapor canister 40 to flow into intake manifold 16 for combustion in at least one of the plurality of cylinders 14.

Note, under various conditions, the throttle may be adjusted to control the amount of air flowing through the fuel vapor canister as well as to the engine. The amount of throttling may be adjusted based on whether or not the motor is driving the compressor. For example, the throttle may be adjusted to throttle more when the motor is operating to drive the compressor and less when the motor is not operating. Moreover, the degree of throttling via the throttle may be a function of boost. For example, when e-boosting is greater throttling may be increased to force more air through the fuel vapor canister to extract fuel vapors.

Furthermore, the degree of throttling via the throttle may also be a function of how much fuel vapor are stored in the fuel vapor canister. For example, if the fuel vapor canister is substantially full, a greater amount of boost and cooperatively more throttling may be provided to drive the fuel vapors out of the fuel vapor canister and into the engine.

The engine system 10 may further include control system 50. Control system 50 is shown receiving information from a plurality of sensors 52 (various examples of which are described herein) and sending control signals to a plurality of actuators 54 (various examples of which are described herein). As one example, sensors 52 may include fuel vapor sensor 42 (located in downstream passage 37). Other sensors such as pressure, temperature, air/fuel ratio, state of charge (SOC) and composition sensors may be coupled to various locations in engine system 10, as discussed in more detail herein. As another example, the actuators may include fuel injectors (not shown), a variety of valves, throttle 18, and motor/generator 30. The control system 50 may include a controller 13. The controller may receive input data from the various sensors, process the input data, and trigger the actuators in response to the processed input data, based on instructions or code programmed therein, corresponding to one or more routines. An example control routine carried out by the control system is described herein with reference to FIGS. 3 and 4.

Figure 2:
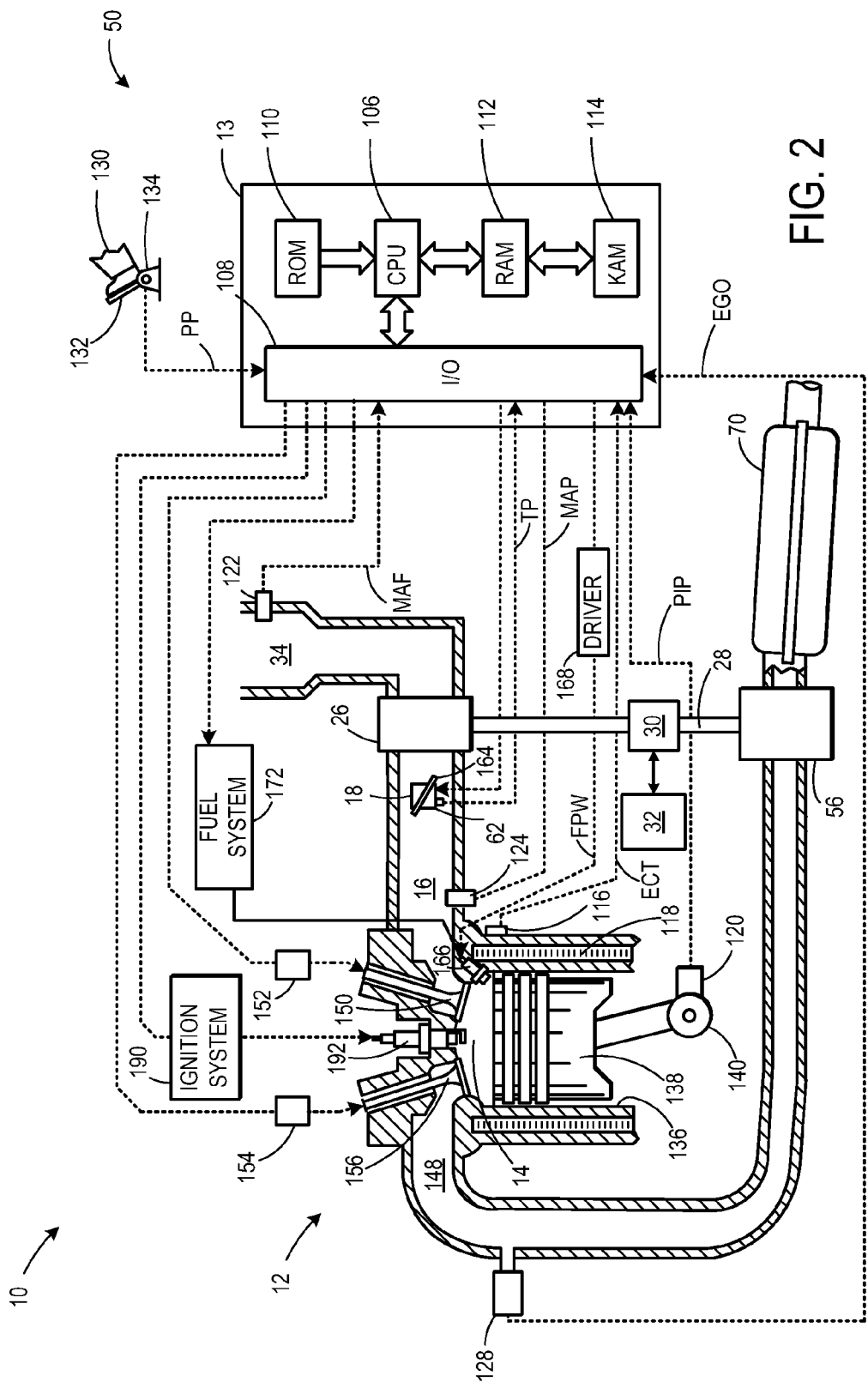
FIG. 2 shows a partial engine view of the engine of FIG. 1.

FIG. 2 depicts an example embodiment of a combustion chamber or cylinder 14 of internal combustion engine 12. The engine 12 may be controlled at least partially by a control system 50 including controller 13 and by input from a vehicle operator 130 via an input device 132. In this example, input device 132 includes an accelerator pedal and a pedal position sensor 134 for generating a proportional pedal position signal PP. The cylinder (i.e. combustion chamber) 14 of engine 12 may include combustion chamber walls 136 with piston 138 positioned therein. The piston 138 may be coupled to crankshaft 140 so that reciprocating motion of the piston is translated into rotational motion of the crankshaft. The crankshaft 140 may be coupled to at least one drive wheel of the passenger vehicle via a transmission system. Further, a starter motor may be coupled to crankshaft 140 via a flywheel to enable a starting operation of engine 12.

The cylinder 14 can receive intake air intake air inlet 34 and intake manifold 16. The air inlet 34 and intake manifold 16 can communicate with other cylinders of engine 12 in addition to cylinder 14. In some embodiments, one or more of the intake passages may include a boosting device 24 such as a turbocharger or a supercharger that may be electrically actuated under some conditions. For example, FIG. 2 shows engine 12 configured with a turbocharger including a compressor 26 arranged between air inlet 34 and intake manifold 16, and an exhaust turbine 56 arranged along exhaust passage 148. The compressor 26 may be at least partially powered by the exhaust turbine 56 via shaft 28. However, in other examples, such as where engine 12 is provided with a supercharger, the exhaust turbine may be optionally omitted, where compressor 26 may be powered by mechanical input from a motor or the engine. Further still, shaft 28 may be coupled to electric motor/generator 30 (as depicted in FIG. 1) to provide an electric boost, as needed. A throttle 18 including a throttle plate 164 may be provided along an intake passage of the engine for varying the flow rate and/or pressure of intake air provided to the engine cylinders. For example, throttle 18 may be disposed downstream of compressor 26 as shown in FIG. 2, or may be alternatively provided upstream of compressor 26.

Exhaust passage 148 can receive exhaust gases from other cylinders of engine 12 in addition to cylinder 14. Exhaust gas sensor 128 is shown coupled to exhaust passage 148 upstream of emission control device (ECD) 70. The exhaust gas sensor 128 may be any suitable sensor for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor. The emission control device 70 may be a three way catalyst (TWC), NOx trap, various other emission control devices, or combinations thereof. In some embodiments, a plurality of emission control devices may be provided in exhaust passage 148.

The emission control device 70 may enable regulated combustion by-products generated in the exhaust, such as NOx species, unburned hydrocarbons, carbon monoxide, etc., to be catalytically converted before expulsion to the atmosphere. However, the catalytic efficiency of the catalyst may be largely affected temperature by the temperature of the exhaust gas. For example, the reduction of NOx species may occur more efficiently at higher temperatures as compared to the oxidation of carbon monoxide. Unwanted side reactions may also occur at lower temperatures, such as the production of ammonia and $N_2O$ species, which may adversely affect the efficiency of exhaust treatment, and degrade the quality of exhaust emissions. Thus, high efficiency catalytic treatment of exhaust may be delayed until the catalyst(s) have attained a light-off temperature. Additionally, to improve the efficiency of exhaust after-treatment, it may be desirable to expedite the attainment of the catalyst light-off temperature.

Each cylinder of engine 12 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 12, including cylinder 14, may include at least two intake poppet valves and at least two exhaust poppet valves located at an upper region of the cylinder.

Intake valve 150 may be controlled by controller 13 via actuator 152. Similarly, exhaust valve 156 may be controlled by controller 13 via actuator 154. Under some conditions, controller 13 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or by various suitable combinations of variable intake cam timing, variable exhaust cam timing, dual independent variable cam timing or fixed cam timing. Each cam actuation system may include one or more cams and may utilize one or more of cam profile switching (CPS), variable cam timing (VCT), variable valve timing (VVT) and/or variable valve lift (VVL) systems that may be operated by controller 13 to vary valve operation. For example, cylinder 14 may alternatively include an intake valve controlled via electric valve actuation, and an exhaust valve controlled via cam actuation including CPS and/or VCT. In other embodiments, the intake and exhaust valves may be controlled by a common valve actuator or actuation system, or a variable valve timing actuator or actuation system. The engine may further include a cam position sensor whose data may be merged with the crankshaft position sensor to determine an engine position and cam timing.

In some embodiments, each cylinder of engine 12 may include a spark plug 192 for initiating combustion. Ignition system 190 can provide an ignition spark to combustion chamber 14 via spark plug 192 in response to spark advance signal SA from controller 13, under select operating modes. However, in some embodiments, spark plug 192 may be omitted, such as where engine 12 may initiate combustion by auto-ignition or by injection of fuel as may be the case with some diesel engines.

In some embodiments, each cylinder of engine 12 may be configured with one or more fuel injectors for providing fuel thereto. As a non-limiting example, cylinder 14 is shown including fuel injector 166 coupled directly to cylinder 14. Fuel injector 166 may inject fuel directly therein in proportion to the pulse width of signal FPW received from controller 13 via electronic driver 168. In this manner, fuel injector 166 provides what is known as direct injection (hereafter referred to as "DI") of fuel into combustion cylinder 14. While FIG. 2 shows injector 166 as a side injector, it may also be located overhead of the piston, such as near the position of spark plug 192. Alternatively, the injector may be located overhead and near the intake valve. Fuel may be delivered to fuel injector 166 from high pressure fuel system 172 including a fuel tank, fuel pumps, and a fuel rail. Alternatively, fuel may be delivered by a single stage fuel pump at lower pressure. Further, while not shown, the fuel tank may have a pressure transducer providing a signal to controller 13.

It will be appreciated that in an alternate embodiment, injector 166 may be a port injector providing fuel into the intake port upstream of cylinder 14. It will also be appreciated that cylinder 14 may receive fuel from a plurality of injectors, such as a plurality of port injectors, a plurality of direct injectors, or a combination thereof.

Controller 13 is shown in FIG. 2 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 13 may receive various signals from sensors coupled to engine 12, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type, such as a crankshaft position sensor) coupled to crankshaft 140; throttle position (TP) from a throttle position sensor (not shown); and absolute manifold pressure signal (MAP) from sensor 124. Engine speed signal, RPM, may be generated by controller 13 from signal PIP (or the crankshaft position sensor). Manifold pressure signal MAP from a manifold pressure sensor may be used to provide an indication of vacuum, or pressure, in the intake manifold. A state of charge signal may be sent to controller 13 from a state of charge sensor that detects the state of charge of electrical storage device 32 (shown in FIG. 1). Various temperature signals may send temperature signals to controller 13. For example, an engine coolant temperature sensor may send an engine temperature signal, an ambient temperature sensor may send a ambient temperature signal, a electrical storage device temperature sensor may send an electrical storage device temperature signal, a fuel temperature sensor may send a fuel temperature signal, and/or an emission control device temperature sensor may send an emission control device temperature signal to controller 13. Storage medium read-only memory 110 can be programmed with computer readable data representing instructions executable by processor 106 for performing the methods described below as well as other variants that are anticipated but not specifically listed.

As described above, FIG. 2 shows only one cylinder of a multi-cylinder engine. As such each cylinder may similarly include its own set of intake/exhaust valves, fuel injector(s), spark plug, etc.

Figure 3:
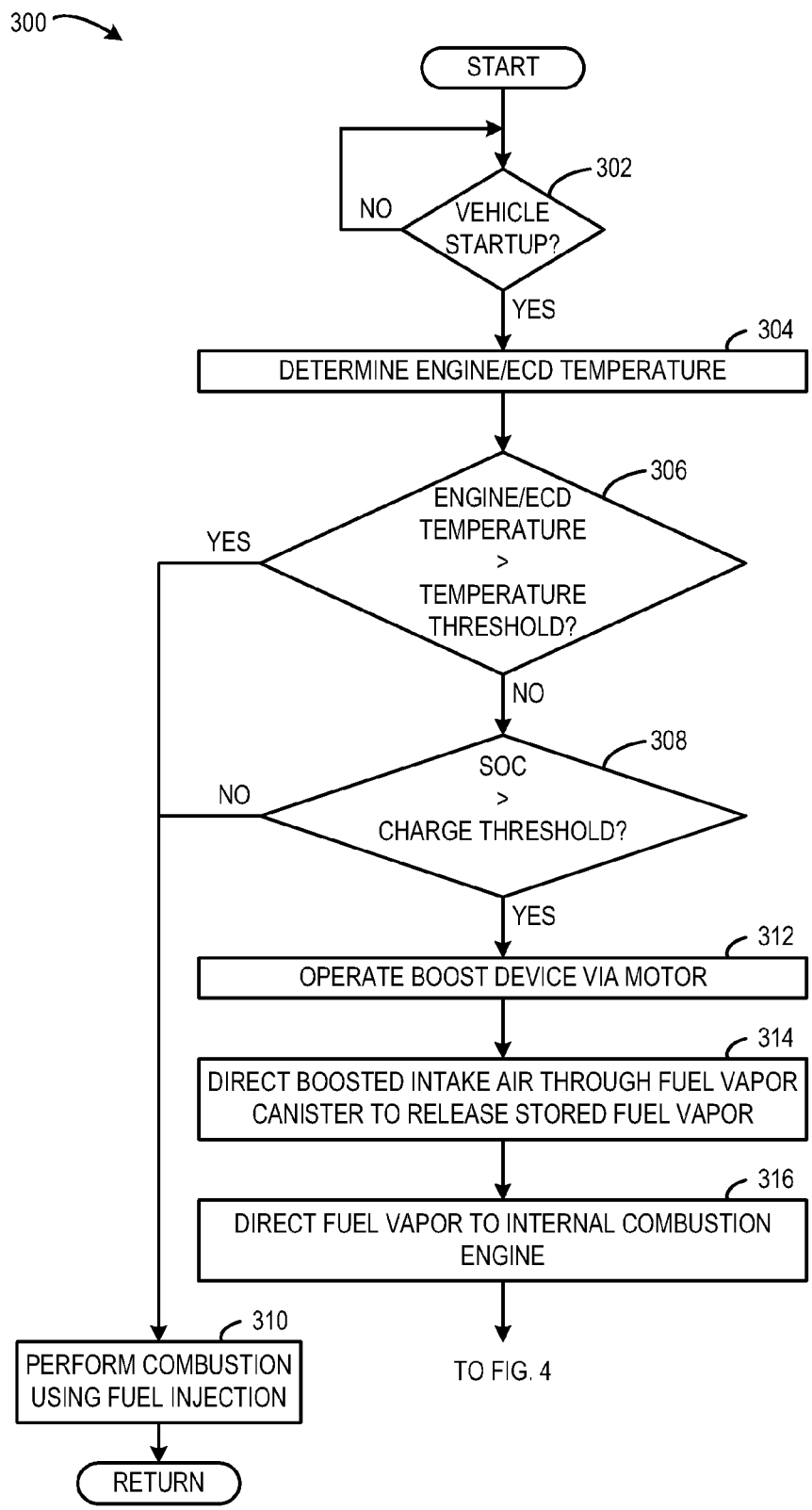
FIGS. 3-4 show flow diagram of an embodiment of a method for performing engine startup that selectively uses fuel vapor for combustion.
Figure 4:
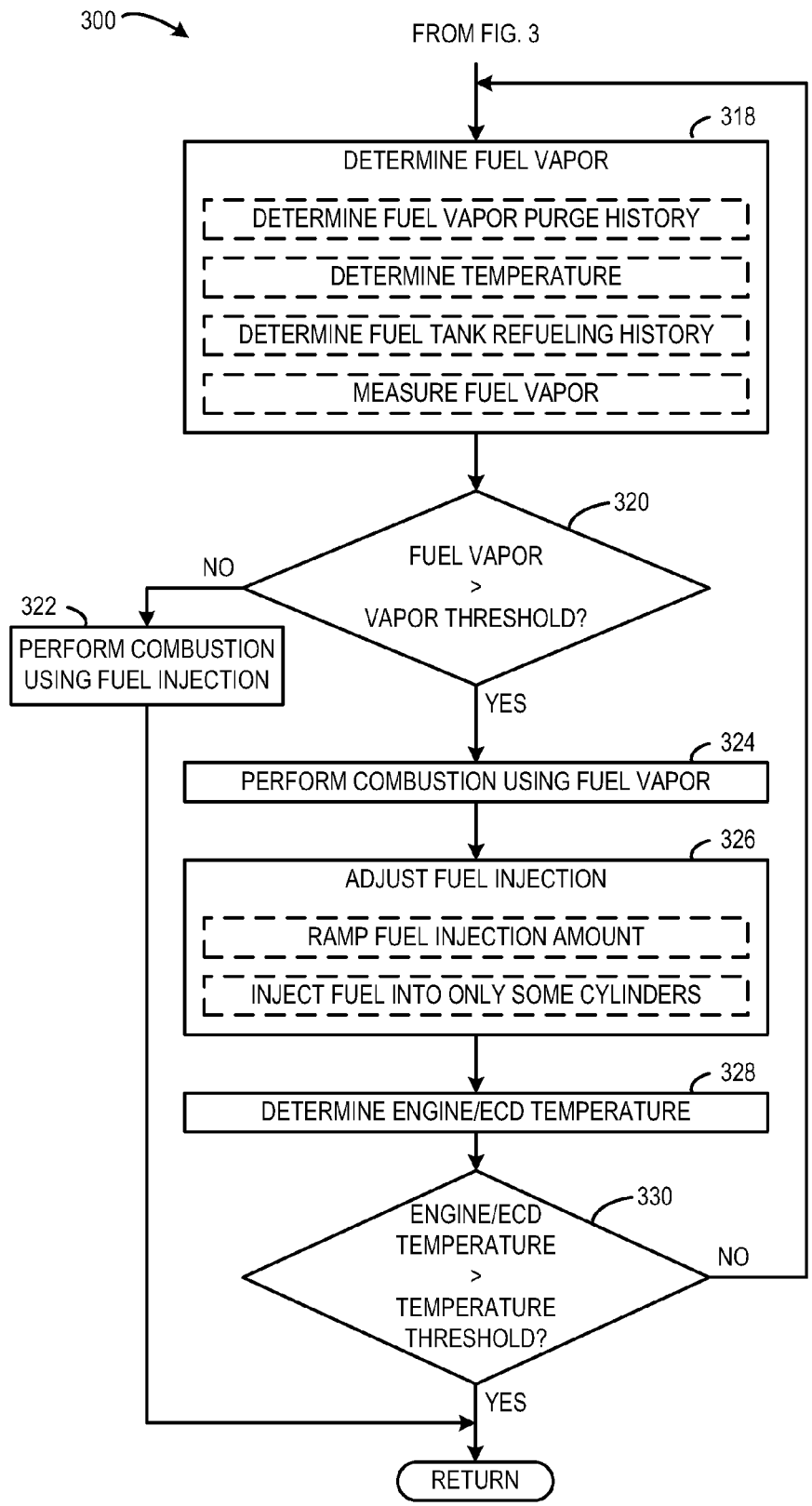

FIGS. 3-4 show flow diagram of an embodiment of a method 300 for performing engine startup that selectively uses fuel vapor for combustion. The method 300 may be performed by control system 50. At 302, the method may include determining if a vehicle startup condition exists. In some embodiments, the vehicle startup condition may be determined based on position of an ignition/key. In some embodiments, the vehicle startup condition may be determined based on one or more parameters, and may include a first combustion event from rest for a cylinder, engine cranking, and/or others. In another example, the engine startup condition may include a cold starting condition, where it is determined whether the engine is started after having cooled to ambient conditions. If the startup condition exists, the method moves to 304. Otherwise, the startup condition does not exist and the method returns to 302.

At 304, the method may include determining the engine/ emission control device temperature. For example, the engine temperature may be determined from an engine temperature signal received from an engine temperature sensor and/or the emission control device temperature may be determined from an emission control device temperature signal received from an emission control device temperature sensor.

At 306, the method may include determining if the engine/ emission control device temperature is greater than a threshold temperature. The temperature threshold may be set to various suitable temperatures. For example, the temperature threshold may be set to the light-off temperature of the emission control device or another corresponding temperature. By considering the engine and/or emissions control device temperature when deciding whether or not to perform an e-boost to provide fuel vapor for combustion, engine and/or emissions control device overheating may be inhibited and operating efficiency may be improved. If the engine/emission control device temperature is greater than the temperature threshold the method moves to 308. Otherwise, the engine/ emission control device temperature is not greater than the temperature threshold and the method moves to 310.

At 308, the method may include determining if a state of charge of an electrical storage device is greater than a charge threshold. In one example, the electrical storage device may be electrical storage device 32 that may provide electrical power to operate motor 30 to turn compressor 26 via shaft 28 in order to provide an electrical boost to intake air as show in FIG. 1.

The state of charge of the electrical storage device may be considered in order to determine whether or not there is enough power in the electrical storage device to provide an e-boost. For example, in embodiments where the electrical storage device provides electrical power to a starter motor for engine cranking during engine starting, the state of charge may be considered in order to prevent e-boost from draining power that would otherwise be used for engine cranking. That is, the e-boost may be reduced or forgone in order to provide power for engine cranking depending on state of charge (e.g., at low charge levels). Accordingly, e-boosting may be used in a robust manner that does not inhibit engine starting.

The charge threshold may be set to various suitable thresholds. For example, the charge threshold may be set to a level of charge that is capable to power motor 30 for a period of time for compressor 26 to provide an electrical boost to intake air such that fuel vapor are forced from fuel vapor canister 40 into intake manifold 16 for combustion in one or more cylinders of engine 12. If the state of charge is greater than the charge threshold, the method moves to 312. Otherwise, the state of charge is not greater than the charge threshold, and the method moves to 310.

At 310, the method may include performing combustion using liquid fuel via fuel injection and the method may return to other operations. In some cases, combustion may be performed using liquid fuel via fuel injection and not the fuel vapor because the engine/emission control device has reached a suitable temperature so that an increase in temperature is not warranted.

In some cases, combustion may be performed using fuel injection because there is not enough charge in the electrical storage device to extract a suitable amount of fuel vapor from the fuel vapor canister to perform combustion using fuel vapor. In other words, compressor 26 cannot be operated at suitable speed or for a suitable period of time to create an electrical boost in air charge suitable to force the fuel vapor from fuel vapor canister 40 into intake manifold 16. Thus, in one example, the engine may be started without driving the compressor via the motor and without purging fuel vapors to a cylinder of the engine during the start using boosted air. In still another example, during a second cold start condition where a state of charge of the electrical storage device is lower than a charge threshold, the electric motor may be operated to a lesser extent (e.g., shorter time period, slower, etc.), and combustion may be performed in the at least one cylinder using liquid fuel, or liquid fuel and fuel vapor during the engine starting.

In still another example, as the SOC of the electrical storage device decreases during an engine start less e-boost may be available to drive fuel vapors out of the fuel vapor canister and thus less fuel vapor may be available for combustion, so the amount of fuel injection for combustion may be increased to compensate for the decrease in fuel available fuel vapor. In other words, as SOC decreases, fuel injection for combustion may increase to stabilize combustion during engine starting. In still another example, as the state of charge of the electrical storage device that is available during engine start decreases from one start to another, the different engine starts may include differing levels of electrically generated boost via the motor, where less motor-generated boost is provided at lower states of charge. Accordingly, from one start to another where less fuel vapor is available for combustion due to decreased SOC of the electrical storage device, an amount of liquid fuel provided via fuel injection may be increased to compensate for the decreased amount of fuel vapors in order to improve combustion stability during engine starting.

At 312, the method may include operating the boosting device via the electric motor. The boosting device may be operated via the electric motor to provide an electric boost to intake air downstream of compressor 26. It will be appreciated that during operation of the boost device, the boost level may be adjusted based on operating conditions, e.g., SOC as noted above.

In some embodiments, the method may include operating the boosting device via the motor during a starting condition based on a level/amount of boost generated by the exhaust turbine being below a threshold boost value. For example, during start, when there is relatively low exhaust flow rate and low heat available for spinning the turbine/compressor, the boosting device may be operated by the electric motor to provide an e-boost. In other words, the motor may operate the compressor in conditions where the exhaust is not generating the boost (or generating less than a threshold amount), or that turbine speed is less than a threshold amount. Accordingly, fuel vapor may be provided for combustion quicker than would be possible in a system with a compression device only driven by engine exhaust.

At 314, the method may include directing boosted intake air through the fuel vapor canister to release fuel vapor. For example, directing may include at least partially closing the throttle 18, closing atmosphere valve 38 and at least partially opening upstream valve 36. In some cases, the amount that upstream valve 36 is opened may be varied to vary the amount of air charge/air pressure that enters fuel vapor canister 40 to control the amount of fuel vapor forced out of the fuel vapor canister. In some cases, boosting device 24, throttle 18, and/or upstream valve 36 may be controlled cooperatively to vary the air charge/air pressure entering fuel vapor canister 40.

The various engine components may be controlled to adjust the amount of intake air directed to the fuel vapor canister to accommodate various operating conditions. For example, the components may be controlled to adjust the amount/charge of intake air directed to fuel vapor canister based on ambient temperature. In one example, the amount/charge of intake air may be increased as ambient temperature increase since there may be many more vapors available (or that need to be purged) as a result of heat vaporization when ambient temperature conditions are higher than when lower.

At 316, the method may include directing fuel vapor to the internal combustion engine. For example, directing may include closing fuel tank vent valve 46 and at least partially opening downstream valve 44. In some cases, the amount that downstream valve 44 is opened may be varied to vary the amount of fuel vapor that enters intake manifold 16 to control the amount of fuel vapor entering the cylinders of the engine. In some cases, boosting device 24, upstream valve 36, and downstream valve 44 may be controlled cooperatively to vary the fuel vapor entering intake manifold 16. In some cases, intake valve of engine 12 may be controlled to allow fuel vapors to enter selected cylinder of engine 12. Fuel vapor may be provided to less than all cylinders when the amount/level of fuel vapor as measured by fuel vapor sensor 42 is only high enough for suitable combustion to take place in the selected cylinders. The number of cylinders to which fuel vapor is provided may be based on an amount of fuel vapor released from the fuel vapor canister. For example, in a situation where there only enough fuel vapor for stable combustion in one cylinder, the engine intake valve timing may be adjusted so that an intake valve of only one cylinder opens to admit the fuel vapors for combustion. By providing fuel vapor to less than all cylinders or to a particular cylinder based on an amount of fuel vapors released from the fuel vapor canister, combustion with an insufficient amount of fuel, which could cause unstable combustion that results in a miss-start/no-start, may be avoided. In other cases, fuel vapors may be admitted to all cylinders and combustion may be supplemented with liquid fuel.

Furthermore, fuel vapor may be provided only for a selected combustion event, such as the first combustion event from rest. In some cases, fuel vapor may be provided for a selected number of combustion events. The number of combustion events may be based on an amount of fuel vapor released from the fuel vapor canister. In particular, fuel vapor released from the fuel tank may be combusted as opposed to being released to the atmosphere. In this way, emissions may be reduced and fuel efficiency may be increased.

Continuing to FIG. 4, at 318, the method may include determining an amount/level of fuel vapor that exits fuel vapor canister 40 to flow into intake manifold 16. In some embodiments, fuel vapor may be determined based on a purge history of the fuel vapor canister/fuel tank. In other words, the system 50 may track the amount/rate that fuel vapor is vented from the fuel tank and/or fuel vapor is purged from fuel vapor canister in combination with other operating parameters to estimate an amount/level of fuel vapors that may be used for combustion. In some embodiments, fuel vapor may be determined based on temperature. For example, an amount/level of fuel vapors may be estimated based on the ambient temperature. In particular, the ambient temperature may indicate a rate of fuel evaporation in the fuel tank. For example, a rate of fuel evaporation may be higher at a substantially hot ambient temperature than at a lower ambient temperature. In some embodiments, fuel vapor may be determined based on a refueling history. For example, an amount/level of fuel vapor may be estimated from when the fuel tank is refilled because as the liquid fuel level in fuel tank increases there is less volume for fuel vapor to occupy which may force fuel vapor into the fuel vapor canister. In some embodiments, fuel vapor may be determined from measuring an amount/level of fuel vapor such as measured by fuel vapor sensor 42. In some embodiments, two or more of the above described fuel vapor determining procedures may be used in combination to determine fuel vapors available for combustion.

At 320, the method may include determining if the fuel vapor is greater than a fuel vapor threshold. The fuel vapor threshold may be set to various suitable thresholds, such as corresponding to the amount of fuel that enables a first combustion event for at least one single cylinder. As another example, the fuel vapor threshold may be set at an amount/level at which suitable combustion be performed in one or more cylinders of engine 12.

If it is determined that the fuel vapor is greater than the fuel vapor threshold, the method moves to 324. Otherwise, the fuel vapor is not greater than the fuel vapor threshold, and the method moves to 322.

At 322, the method may include performing combustion using fuel injection and the method may return to other operations. Combustion may be performed using fuel injection because there is not enough to fuel vapor to suitably perform combustion using fuel vapor for engine starting. For example, if combustion were to be performed using an amount/level of fuel vapors less than the fuel vapor threshold, combustion may become unstable and engine startup may become degraded. In some embodiments, during a cold start condition where an amount of the fuel vapors is lower than the fuel vapor threshold, combustion may not be performed using the fuel vapor and instead combustion may be performed using liquid fuel injection.

At 324, the method may include performing combustion using fuel vapor. In some cases, combustion may be performed using fuel vapor in all cylinders. For example, combustion via fuel vapor may be performed in all cylinders based on engine/emissions control device temperature in order to minimize time for the emissions control device temperature to reach a light-off temperature during engine cold start. In some cases, combustion may be performed using fuel vapor in less than all cylinders. In some cases, combustion may be performed using fuel vapor in one or more cylinders and combustion may be performed using liquid fuel in one or more cylinders. In some cases, combustion may be performed using fuel vapor and liquid fuel in one or more cylinders.

At 326, the method may include adjusting fuel injection. In some cases, adjusting fuel injection may include adjusting an amount of fuel injected by at least one fuel injector into at least one cylinder based on an operating parameter. Note, adjusting may include increasing or ramping up an amount of fuel injected into one or more cylinders under some conditions, and under different conditions, adjusting may include decreasing or ramping down an amount of fuel injected to the one or more cylinders (including not injecting fuel). As an example, the fuel injection amount may be increased or ramped up as an amount of available fuel vapor released from the fuel vapor canister decreases (and vice versa). By adjusting the fuel injection amount based on the amount of fuel vapor available for combustion, combustion may be performed in a stable manner even as the amount of available fuel vapors decrease. As another example, the fuel injection amount may be increased or ramped up as state of charge of electrical storage device 32 decreases (and vice versa). By adjusting the fuel injection amount based on SOC of the battery, combustion may be performed in a stable manner even when there is not enough power available to boost intake air to release fuel vapors from the fuel vapor canister for combustion. As yet another example, the fuel injection amount may be increased or ramped up as engine/emission control device temperature increases (and vice versa). In particular, once the temperature is close to or at the light-off temperature, fuel vapors provided for combustion may be decreased and thus the fuel injection amount may be increased to maintain stable combustion. As yet another example, the fuel injection amount may be decreased or ramped down as ambient temperature increases, because additional fuel vapor may be created by the temperature increase which may need to be released from the fuel tank/fuel vapor canister.

In some cases, adjusting may include injecting liquid fuel into only some cylinders. Intake valves of cylinders may be controlled in conjunction with injecting liquid fuel so that some cylinders receive fuel vapor and some cylinders receive liquid fuel, or a combination of liquid fuel and fuel vapor. In some cases, combustion using fuel vapor may be stopped in favor of combustion using liquid fuel upon reaching one or more of the above described thresholds. Adjusting fuel injection may be performed dynamically during and/or after start-up as operating conditions change. In one example, the amount of liquid fuel is adjusted based on an estimate of the amount of fuel vapors coming to the cylinder from the fuel vapor canister and the level of motor boosting. In particular, the boost level/motor capability and the estimated amount of fuel vapors may be used cooperatively to accurately predict the amount fuel vapors that will be available for combustion. If the amount of fuel vapors provided to the engine or the boost capability to provide the fuel vapors to the engine vary (e.g., decrease), the fuel injection amount may be varied (e.g., increased) to complement the variance. In this way, combustion may be performed in a robust manner while still leveraging e-boost capabilities to provide fuel vapors for combustion to increase emissions control device heating at engine cold start.

At 328, the method my include determining an engine/emission control device temperature. For example, the engine temperature may be determined from an engine temperature signal received from an engine temperature sensor and/or the emission control device temperature may be determined from an emission control device temperature signal received from an emission control device temperature sensor.

At 330, the method may include determining if the engine/emission control device temperature is greater than a threshold temperature. The temperature threshold may be set to various suitable temperatures. For example, the temperature threshold may be set to the light-off temperature of the emission control device or another corresponding temperature near the light-off temperature. If the engine/emission control device temperature is greater than the temperature threshold the method returns to other operations. Otherwise, the engine/emission control device temperature is not greater than the temperature threshold and the method returns to 318 to attempt to continue combustion using fuel vapors to increases the engine/emission control device temperature.

The method may be performed to reduce the amount of time needed for an emission control device light-off temperature to be attained in an exhaust after-treatment system coupled to a vehicle engine, at a cold start condition. In particular, during a cold start condition, a boosting device may be used to direct fuel vapor stored in a fuel vapor canister to the engine for combustion. By providing fuel vapor for combustion, cylinder wall wetting as a result of liquid fueling that would inhibit cylinder wall heating may be reduced. In this way, during a cold start condition, cylinder heating and correspondingly emission control device heating may be improved. This may result in improved exhaust after-treatment efficiency and reduced emissions released to the atmosphere. Moreover, by using a boosting device to provide fuel vapor from the fuel vapor canister, fuel vapor may be used for combustion as opposed to being released to the atmosphere. In this way, fuel efficiency may be improved and vehicle emissions may be reduced.

Note that the example control and estimation routines included herein can be used with various system configurations. The specific routines described herein may represent one or more of any number of processing strategies such as event-driven, interrupt-driven, multi-tasking, multi-threading, and the like. As such, various actions, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, functions, or operations may be repeatedly performed depending on the particular strategy being used. Further, the described operations, functions, and/or acts may graphically represent code to be programmed into computer readable storage medium in the control system.

Further still, it should be understood that the systems and methods described herein are exemplary in nature, and that these specific embodiments or examples are not to be considered in a limiting sense, because numerous variations are contemplated. Accordingly, the present disclosure includes all novel and non-obvious combinations of the various systems and methods disclosed herein, as well as any and all equivalents thereof.

The invention claimed is:

1. A method, comprising:
during an engine cold start condition, operating an electric motor coupled to a compressor to boost engine intake air;
directing the boosted intake air through a fuel vapor canister to release fuel vapor stored in the fuel vapor canister and deliver the vapor to an engine cylinder; and
performing combustion in the engine cylinder using the fuel vapor during engine cranking of an engine start.

2. A method, comprising:
during an engine cold start condition, operating an electric motor coupled to a compressor to boost engine intake air;
directing the boosted intake air through a fuel vapor canister to release fuel vapor stored in the fuel vapor canister and deliver the fuel vapor to an engine cylinder; and
performing combustion in the engine cylinder using the fuel vapor during engine starting.

3. The method of claim 2, further comprising:
performing combustion using liquid fuel and not the fuel vapor in response to an emission control device reaching a light-off temperature, and where the combustion is performed during engine cranking.

4. The method of claim 2, wherein the electric motor is at least partially powered by an electrical storage device, and the method further comprising:
during a second cold start condition where a state of charge of the electrical storage device is lower than a state of charge of the electrical storage device in the cold start condition and below a charge threshold, operating the electric motor to a lesser extent than in the cold start condition; and performing combustion in the engine cylinder using liquid fuel and/or fuel vapor during engine starting.

5. The method of claim 2, wherein the engine further includes at least one fuel injector to selectively inject fuel into the engine cylinder, and the method further comprises:

adjusting an amount of fuel injected by the at least one fuel injector into the engine cylinder based on an operating parameter.

6. The method of claim 5, wherein adjusting includes increasing the amount of fuel injected as engine temperature increases.

7. The method of claim 5, wherein adjusting includes increasing the amount of fuel injected as the fuel vapor released from the fuel vapor canister decreases.

8. The method of claim 5, wherein the electric motor is at least partially powered by an electrical storage device, and wherein adjusting includes increasing the amount of fuel injected as a state of charge of the electrical storage device decreases.

9. The method of claim 5, wherein the engine includes a plurality of cylinders and adjusting includes injecting fuel into some of the plurality of cylinders.

10. The method of claim 2, further comprising:

during a second cold start condition where an amount of the fuel vapor is lower than an amount of the fuel vapor in the cold start condition and lower than a fuel vapor threshold, not performing combustion in the engine cylinder using the fuel vapor.

11. The method of claim 10, wherein the fuel vapor is determined based on a measurement from a fuel vapor sensor located downstream from the fuel vapor canister and upstream from the engine cylinder.

12. The method of claim 11, wherein the fuel vapor is determined based on one or more of fuel vapor purge history, refueling history, and ambient temperature.

13. A vehicle system, comprising:

an engine including at least one cylinder with a direct fuel injector;

a boosting device including a compressor to boost intake air to the at least one cylinder;

an electric motor to at least partially drive the compressor;

a fuel tank;

a fuel vapor canister to store fuel vapor vented from the fuel tank;

a fuel vapor sensor positioned between the fuel vapor canister and the engine;

an emission control device to treat exhaust gas exhausted from the engine; and a control system configured to during an engine cold start condition, operate the electric motor of the boosting device to boost intake air, direct the boosted intake air through the fuel vapor canister to release a fuel vapor stored in the fuel vapor canister, direct the fuel vapor released from the fuel vapor canister to the engine such that the fuel vapor sensor measures the fuel vapor to indicate a measured fuel vapor, and perform combustion in the at least one cylinder using the fuel vapor when the measured fuel vapor is determined to be greater than a fuel vapor threshold during engine starting.

14. The system of claim 13, further comprising:

a throttle located downstream from the boosting device to control air flow to the at least one cylinder of the engine;

an upstream valve positioned between the boosting device and the throttle and upstream from the fuel vapor canister;

a downstream valve positioned between the throttle and the at least one cylinder and downstream from the fuel vapor canister; and the control system being configured to at least partially close the throttle, at least partially open the upstream valve, and operate the boosting device to direct the boosted intake air through the fuel vapor canister to release the fuel vapor stored in the fuel vapor canister, and to at least partially open the downstream valve to direct the fuel vapor released from the fuel vapor canister to the engine.

15. The system of claim 13, further comprising:

an electrical storage device to supply electrical power to operate the electric motor; and the control system being configured to, during a second cold start condition where a state of charge of the electrical storage device is lower than a state of charge of the electrical storage device in the cold start condition and below a charge threshold, operate the electric motor to a lesser extent than in the cold start condition, and perform combustion in the at least one cylinder using liquid fuel and/or fuel vapor during engine starting.

16. The system of claim 13, wherein the control system is configured to perform combustion in the at least one cylinder using fuel injected by the direct fuel injector when the measured fuel vapor is determined to be not greater than the fuel vapor threshold.

17. The system of claim 16, wherein the control system is configured to increase an amount of fuel injected into the at least one cylinder by the direct fuel injector as the measured fuel vapor decreases, and decreasing the amount of fuel injected as operation of the motor and corresponding boost during the start decrease.

18. The system of claim 16, wherein the engine includes a plurality of cylinders and a plurality of fuel injectors, and wherein the control system is configured to perform combustion in some of the plurality of cylinders using fuel injected from some of the plurality of fuel injectors as the measured fuel vapor decreases.

19. The system of claim 16, further comprising:

a temperature sensor to measure a temperature of the emission control device; and the control system being configured to increase an amount of fuel injected into the at least one cylinder by the direct fuel injector in response to the temperature being greater than a temperature threshold.

* * * * *